United States Patent
Lu et al.

(10) Patent No.: US 7,340,903 B2
(45) Date of Patent: Mar. 11, 2008

(54) SCALABLE POWER GENERATION USING A PULSED DETONATION ENGINE

(75) Inventors: Frank K. Lu, Arlington, TX (US); Donald R. Wilson, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 859 days.

(21) Appl. No.: 10/746,863

(22) Filed: Dec. 24, 2003

(65) Prior Publication Data

US 2005/0144959 A1    Jul. 7, 2005

(51) Int. Cl.
*F02C 5/02* (2006.01)
*F02C 5/12* (2006.01)
*F02C 7/22* (2006.01)

(52) U.S. Cl. .................. 60/776; 60/39.38; 60/39.39; 60/39.76

(58) Field of Classification Search ............. 60/39.38, 60/39.39, 39.4, 39.76, 39.78, 776, 39.15, 60/791
See application file for complete search history.

(56) References Cited

U.S. PATENT DOCUMENTS

| | | | |
|---|---|---|---|
| 5,762,156 A * | 6/1998 | Bates et al. ............... | 180/165 |
| 5,937,635 A | 8/1999 | Winfree et al. | |
| 6,062,018 A * | 5/2000 | Bussing ..................... | 60/39.39 |
| 6,347,509 B1 | 2/2002 | Kaemming et al. | |
| 6,584,761 B2 * | 7/2003 | Hunter, Jr. ................. | 60/204 |
| 6,955,052 B2 * | 10/2005 | Primlani ..................... | 60/776 |
| 7,104,223 B2 * | 9/2006 | Bussing ..................... | 122/379 |

OTHER PUBLICATIONS

Munipalli Ramakanth; Performance Assessment of Ejector Augmented Pulsed Detonation Rockets, American Institute of Aeronautics and Astronautics; AIAA 2001-0830.
Wilson, Donald R.; Analysis Of a Pulsed Normal Detonation Wave Engine Concept; American Institute of Aeronautics and Astronautics; AIAA 2001-1784.
Munipalli Ramakanth; Preliminary Design Of a Pulsed Detonation Based Combined Cycle Engine; ISABE 2001-1213.
Ishii K.; Development Of a New Detonator Using Multiple Tubes For Pulse Detonation Engines; American Institute of Aeronautics and Astronnautics; AIAA 2002-51681.

* cited by examiner

*Primary Examiner*—Charles G Freay
(74) *Attorney, Agent, or Firm*—Gardere Wynne Sewell LLP

(57) ABSTRACT

A scalable power generator is described. A scalable, portable pulsed detonation engine is coupled to a turbine which drives a generator and using commonly available fuels, electric energy is provided. Additional embodiments incorporate a mechanical compressor at the intake of the pulsed detonation engine which is driven by a second turbine, the second turbine drives a shaft that powers the mechanical compressor. Other enhancements to the invention and additional embodiments are described.

43 Claims, 7 Drawing Sheets

SCALABLE POWER GENERATION USING A PULSED DETONATION ENGINE

BACKGROUND

There is a constant need for improved and efficient electric power generation from clean and readily available fuels. Power generation for villages, buildings, hospitals, homes, construction sites, and other operations is desirable in remote areas without infrastructure, in new construction where no power grid or distribution system is available, and as alternative power in response to increasingly frequent blackouts or brownout situations on a main power grid. In some remote areas, due to costs and physical barriers, a traditional power grid may never be built for the distribution of centrally generated electric power. In other situations the existing power grid may be unreliable due to weather events such as ice storms, hurricanes, severe thunderstorms and the like, or a poor infrastructure, a weak local economy, or political or military operations which interfere from time to time with use of the existing power grid as an electrical power source.

In the prior art, gas turbine technology is a known source for generated electrical power. Gas turbines burn natural gas, typically, or other similar fuels to drive turbines which turn a generator and thus produce power. In a gas turbine engine, a flame burns fuel and air and expands combustion products to turn a turbine coupled to a shaft, which itself turns a series of compressors located ahead of the engine to compress incoming air to a high pressure, in a power generation application the thrust power remaining in the exhaust turns a turbine which drives a generator for electrical power generation. The heated exhaust expands and creates thrust energy as the hot gases move towards the exhaust port of the engine. (For propulsion applications, the thrust from the engine exhaust is used to push the vehicle forward, as in a jet engine.)

Pulsed detonation engine technology is a newer technology for producing thrust from the process of burning fuel. In a pulsed detonation engine known in the prior art, thrust is produced as the result of a series of rapidly pulsed detonations to produce an approximately constant volume pressure wave traveling at supersonic speeds to an exhaust point in an engine chamber. This type of engine is currently being considered for flight propulsion, for satellite power, for generating satellite electric power using a magnetohydrodynamic (MHD) power generation which depends on an ionic current flow in the exhaust, for satellite and military operations where high levels of "short burst" power is required, for example, as for so-called "space weapons" which require an extremely high amount of energy in a short burst.

In a pulsed detonation engine, a series of detonations are created in a combustion chamber. If the detonations are not sufficiently rapid, then, the reaction is basically a deflagration or "fast flame" combustion process. However, if certain critical parameters are met, the velocity of the pressure waves being generated at and moving away from the ignition point reaches a critical value, the Chapman-Jouguet velocity. If the velocity of the pressure wave reaches the critical Chapman-Jouguet velocity, the engine undergoes a deflagration to detonation transition, known as "DDT" in the art. Once the combustion process has transitioned to detonation, that is the velocity of the pressure waves traveling away from the ignition point is greater than the critical Chapman-Jouguet velocity, the engine is said to be in detonation mode. In order to maintain this mode, fuel, air or oxygen, and the ignition system all have to be pulsed at a frequency which is rapid enough to support and maintain the pulsed detonation mode, which may be as low as 20 Hz, more typically in the vicinity of 50-60 Hz for example and may be optimally over 100 Hz. Now, instead of a flame, the engine exhibits a series of rapid and continuous explosions, the energy from which is added to the pressure wave traversing the tube. The pressure wave velocity will be supersonic, and may reach Mach 4-5. The thrust available from a pulsed detonation engine is believed to be several times that of a gas turbine or jet engine for the amount of fuel consumed.

In a conventional jet engine or gas turbine, a great deal of the available energy is required to produce the high pressures needed to drive the process. For example, in an engine used in a commercial airliner, the Boeing 747, it is estimated that 70,000 horsepower are used to drive the many mechanical air compressors at the intake of the engine. As a result, a substantial amount of the total energy produced is used to drive the compressors, and this limits the amount of output energy available for other purposes, such as propulsion and power generation.

In contrast, a pulsed detonation engine uses the detonations themselves to produce a pressure wave. Thus, much less energy is needed to compress the air at the intake, which results in a more efficient engine for a given amount of thrust.

An ideal pulsed detonation engine produces a constant volume output pressure wave. In a propulsion system, for example as applied to flight propulsion, the pulsed detonation engine is known to have the capacity to produce more thrust per unit time than a conventional jet or rocket engine. Thus the pulsed detonation engine is a more efficient method to produce the thrust needed for a given application.

There is a need for an improved, scalable, efficient and portable power generation system which can use a variety of readily available fuels to produce electric energy. The applications for such a technology range from power generation plants to portable personal use systems for providing energy to a home or building due to storms, for use in remote locations, or temporarily to replace power during power grid failures caused by a variety of events. Further, there is a need for small, efficient and portable electric power generators for a home, a single building, or a remote village. The various embodiments of the invention described in this application address this need.

SUMMARY OF THE INVENTION

The present invention provides an electric power generation system which is driven by a scalable, portable and efficient pulsed detonation engine, or a combination of such engines operated together, which drives a generator for the production of electricity from commercially available fuels such as butane, methane, propane, hydrogen or like similar fuels. The generator of the invention may be quite small and portable. Alternatively it may be scaled to a larger size if desired.

In accordance with one aspect of the present invention a scalable pulsed detonation engine is provided which receives compressed air at its intake, receives propane at fuel intake valve and mixes the propane with the compressed air, and through the use of a high energy, high frequency ignition system, rapidly transitions from deflagration to detonation combustion to produce a nearly constant volume output in a pulsed detonation mode. The exhaust of the pulsed detonation engine drives a turbine which is used to mechanically turn a generator and thus produce electric power. The electric power may also be used, in part, to drive an electric air compressor to provide the compressed air at the intake and to power the ignition system, so that the power generating process is self-sustaining.

In accordance with another aspect of the invention, the fuel used by the electric generation system of the invention may be modified and may be any one of a number of alternatives, including without limitation methane or natural gas, butane, hydrogen, coal dust or other similar fuels.

In accordance with another aspect of the present invention a mechanical compressor such as is used in a small jet engine is attached to an air intake of the pulsed detonation engine, eliminating the need for supplying the compressed air at the intake. The mechanical compressor is turned by a rotating shaft which is itself turned by the turbine at the output of the pulsed detonation engine referred to above. The exhaust output from the first turbine is then used to turn a second turbine, and this turbine is now used to drive the generator and so derive the electric power output by the system. Thus an efficient and scalable "air breathing" generator using the pulsed detonation engine of the invention is provided.

Still further, additional features of the present invention may be applied to increase the efficiency of the power generation system. As an example multiple detonation tubes of small size may be used instead of a single detonation tube. Additional complexity to the fuel and ignition systems may also further increase efficiency. A Shchelkin spiral coil, or other disturbing elements in the main tube, may be used in the ignition chamber to increase the transition speed from deflagration to detonation and thus increase the efficiency. Some remaining exhaust energy may be claimed by using an afterburner to burn some of the exhaust from the engine, or, by thermal exchange to capture exhaust heat in a heat exchanger, or by other means. Multiple sidewall ports may be used to inject fuel and oxidizing agents to improve the engine performance over a single fuel and oxidizer valve.

The present invention provides a scalable power generation system that can be operated using readily available fuel supplies. The power generator may be portable and quite small, or, it may be increased in scale to provide a gas fired or propane power generation plant with increased efficiency. It may be used as an emergency power supply, a backup generator, a remote use generator, for recreational use, for military use, and especially in areas without a power grid, as a residential or village power source. Multiple pulsed detonation engine tubes may be used in a parallel arrangement to increase the scale and the corresponding power output may be proportionally increased as well. The system could be sized to be a truck or trailer mounted system for small villages and buildings, or may be sized to be carried by one or two people, or supplied in a wheeled fashion for easy manual delivery to a desired site.

Those skilled in the art will further appreciate the above-noted features and advantages of the invention together with other important aspects thereof, upon reading the detailed description which follows in conjunction with the drawings.

DETAILED DESCRIPTION OF THE PREFERRED EMBODIMENTS

Figure 1A:
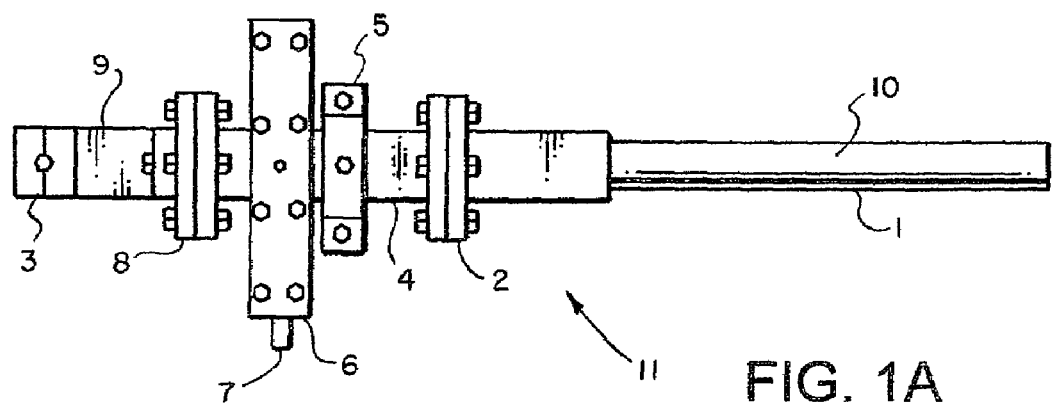
FIGS. 1A-1B are a simplified drawings of a pulsed detonation engine for use in the invention.

In the description which follows like parts are marked throughout the specification and drawing with the same reference numerals, respectively. The drawing FIGURES are not necessarily to scale and certain features may be shown exaggerated in scale or in somewhat generalized or schematic form in the interest of clarity and conciseness.

Referring to FIG. 1, there is illustrated a portion of a first preferred embodiment of a pulsed detonation engine 11 for use in the invention. Pulsed detonation engine 11 is illustrated having detonation tube 10 coupled by flanges 2 to an ignition chamber tube 4. Igniter 5 is mounted to tube 4 adjacent a rotary valve 7 which receives a fuel and oxygen mixture which is provided into the ignition chamber 4. Flange 8 then couples air intake mount 9 to an end cap 3. The components may be made, for example, of steel, stainless steel or another alloy steel, a prototype has been fabricated of simple bulk steel. The components may be made of any of several sizes, the tube 1 may have an inner diameter of as short as 10-20 mm and is scalable to any maximum size desired, and lengths may vary from as short as 60 cm or less in length, and are scalable up to any desired size. Cooling may be provided by air, forced air, or typically in a preferred embodiment, a water jacket (not shown) circulating coolant around the exterior of the engine and having a water pump and a conventional radiator for cooling the hot water before returning it to the engine water jacket may be used. The valves used in the preferred embodiment are simple and robust, requiring very little maintenance and lubrication in use.

Ignition is a critical component in achieving and maintaining the deflagration to detonation transition ("DDT") which is required to create a detonation engine process with the increased thrust advantageously provided by such an engine. It has been discovered by the inventors hereto that prior art approaches to detonation engine ignition may not provide sufficient frequency and/or sufficient instantaneous energy required to quickly achieve and maintain a detonation pressure wave in the engine. The igniter 5 used in a preferred embodiment of this invention is based on a large capacitive discharge and a control circuit has been designed to operate an off-the-shelf overvoltage type triggered spark gap device driven by the capacitive discharge, this igniter can achieve operating frequencies of over 100 Hz and power levels of up to 28 Joules, with an energy of 18 Joules being used typically in one preferred embodiment. The triggered spark gap device is commercially available from suppliers and may be commercially known as a "trigatron." Use of the igniter apparatus of the invention enables a rapid transition from the inefficient deflagration mode of combustion to the desired detonation mode of combustion. Further, use of this igniter allows for a shorter detonation tube than would otherwise be required to achieve a detonation mode of combustion, as tube length is a factor in the ease and speed of transition to the detonation mode. A shorter tube length is desirable but use of a shorter detonation tube requires the high frequency, high energy ignition of the invention, otherwise a longer tube is needed to achieve a detonation mode of operation. Longer tube lengths create additional inefficiencies as velocity of the gas flow is slowed by the additional tube length.

In operation, the engine of the preferred embodiment shown in FIG. 1 is initially started by beginning a cyclical supply of the fuel, air and oxidizer and the igniter is operated in phase with the rotary valves to start the engine. The frequency of the ignition is then increased synchronously with the fuel, oxidizer and air valve frequency in order to achieve the operating frequency. The frequency of operation may be as little as 10-20 Hz, reliable operation of a prototype has been observed at 60 Hz, and may also be run at faster operation of over 100 Hz. The air intake is used to supply air for ignition cycles and also to purge the tube 10 between detonation cycles.

Figure 1B:
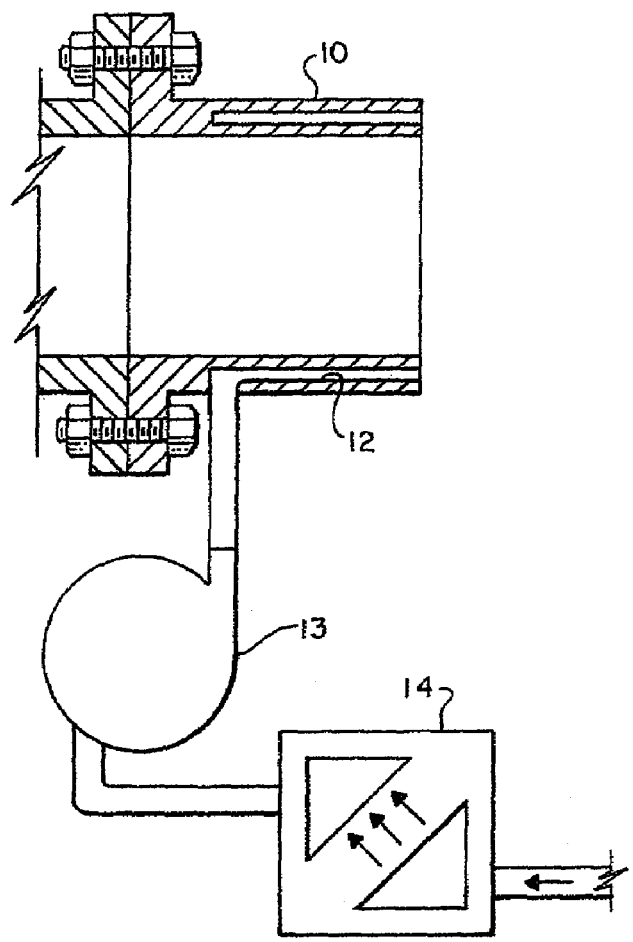
Figure 2:
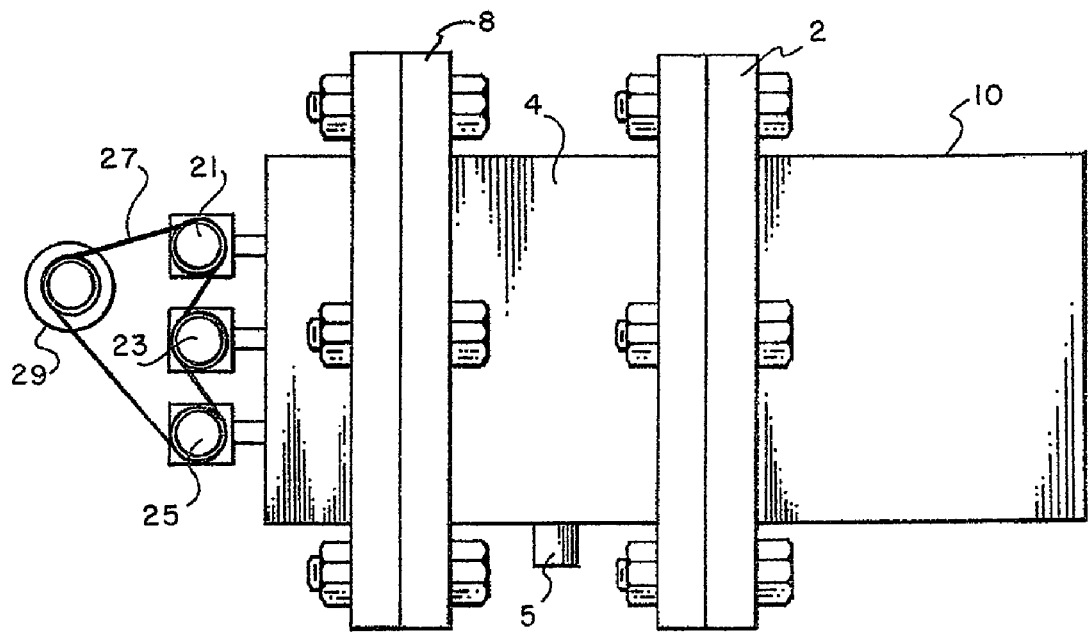
FIG. 2 is a drawing of a first embodiment of the pulsed detonation engine of the invention incorporating the pulsed detonation engine depicted in FIG. 1 and depicting rotary valves used with the pulsed detonation engine.

In FIG. 2, a second preferred embodiment of a pulsed detonation engine of the invention is depicted. In FIG. 2, the tube 10 of FIG. 1 is again provided with flange 2 coupling the tube 10 to an ignition chamber 4 with igniter 5. Flange 8 couples the ignition chamber 4 to an end cap which receives three inputs, one for fuel, one for an oxidizer such as oxygen, and one for compressed air. Now the FIG. 2 shows in detail the supply valves. Valve 21 provides the fuel, valve 23 provides the compressed air, and valve 25 provides the oxidizer.

The valves required for air intake, fuel and oxidizer may be, for example, mechanically driven rotary type valves. As shown in FIG. 2, a separate valve may be provided for fuel, a second for oxygen, and a third valve may be used to purge the tube between detonation cycles. In detonation mode the fuel, oxidizer, air intake valve and igniter are all operated synchronously together to produce pulsed detonations with and purge cycles in between, at a frequency of from 10-20 Hz to over 100 Hz. In the preferred embodiment of FIG. 2, a trapezoidal manifold mount may be used to mount three rotary valves at the closed end of the tube, these are maintained in correct positional relation by a single belt 27, and in one arrangement contemplated as part of the invention and depicted in FIG. 2, there is a single rotary motor 29 driving the belt. Other arrangements are possible for the valves and the drive motor. Alternate arrangements may be used such as eliminating the oxygen valve 25 if the compressed air and fuel are mixed correctly without it, or using separate drive motors for the valves and using multiple belts, and other modifications can be made as will be apparent to those skilled in the art.

In operation of the pulsed detonation engine of FIG. 2, the compressed air valve 23 is used both to supply the compressed air for ignition cycles as determined by the frequency of operation of the igniter 5, and to purge the tube 10 between detonation cycles. This may be accomplished several ways, for example through the use of gearing to turn the valve 23 at a rate that is twice that of the valves 21 and 25, or by manufacturing the rotary valve 23 to provide twice the number of valve ports so that it opens twice as often in a given rotation of the motor 29, or by other means which will be apparent to those skilled in the art.

Referring to FIG. 1A, there is illustrated a portion of a first preferred embodiment of a pulsed detonation engine 11 for use in the invention. Pulsed detonation engine 11 is illustrated having detonation tube 10 coupled by flanges 2 to an ignition chamber tube 4. Igniter 5 is mounted to tube 4 adjacent a rotary valve 7 which receives a fuel and oxygen mixture which is provided into the ignition chamber 4. Flange 8 then couples air intake mount 9 to an end cap 3. The components may be made, for example, of steel, stainless steel or another alloy steel, a prototype has been fabricated of simple bulk steel. The components may be made of any of several sizes, the tube 1 may have an inner diameter of as short as 10-20 mm and is scalable to any maximum size desired, and lengths may vary from as short as 60 cm or less in length, and are scalable up to any desired size. Cooling may be provided by air, forced air, or typically in a preferred embodiment, a water jacket 12 circulating coolant around the exterior of the engine and having a water pump 13 and a conventional radiator 14 for cooling the hot water before returning it to the engine water jacket may be used, as shown for example in FIG. 1B. The valves used in the preferred embodiment are simple and robust, requiring very little maintenance and lubrication in use.

Other enhancements may also be added to the engine 11 of FIG. 1 to increase the efficiency. For example, obstacles in the main tube such as a Shchelkin spiral in the main tube, baffles, orifices or other obstacles may be used which result in enhanced operational efficiency by aiding the transition from deflagration to detonation mode. In a preferred embodiment of the invention, a Shchelkin spiral having a volume of, for example, about 20% of the open tube volume, is placed inside the tube in near proximity to the igniter 5 and this has been found to improve the rapid transition to detonation mode.

Figure 3:
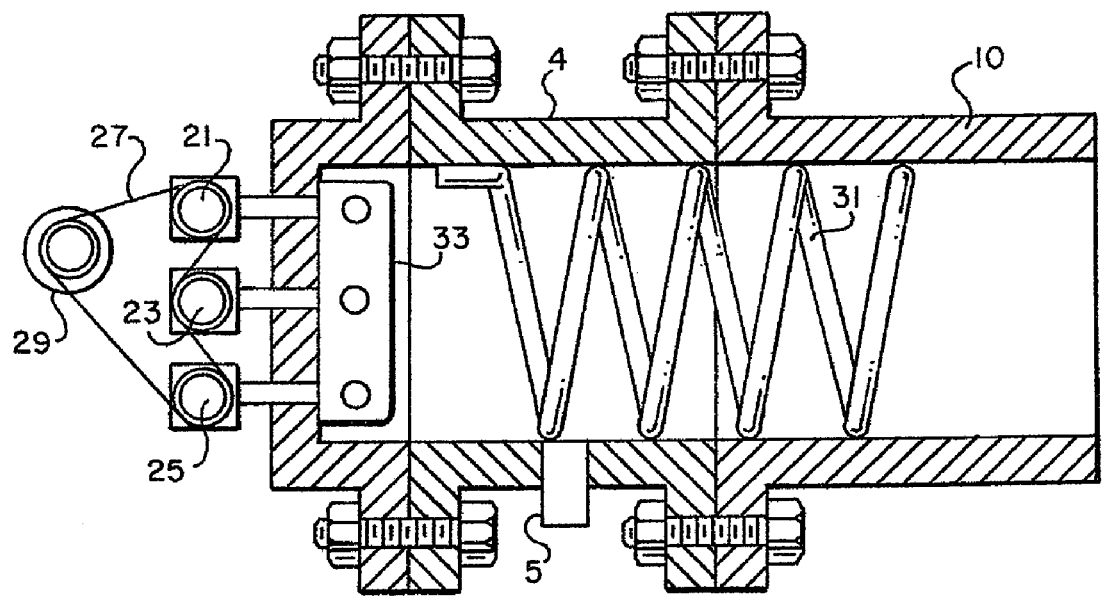
FIG. 3 is a drawing of the tube of the pulsed detonation engine of FIG. 2 in cross section.
Figure 4:
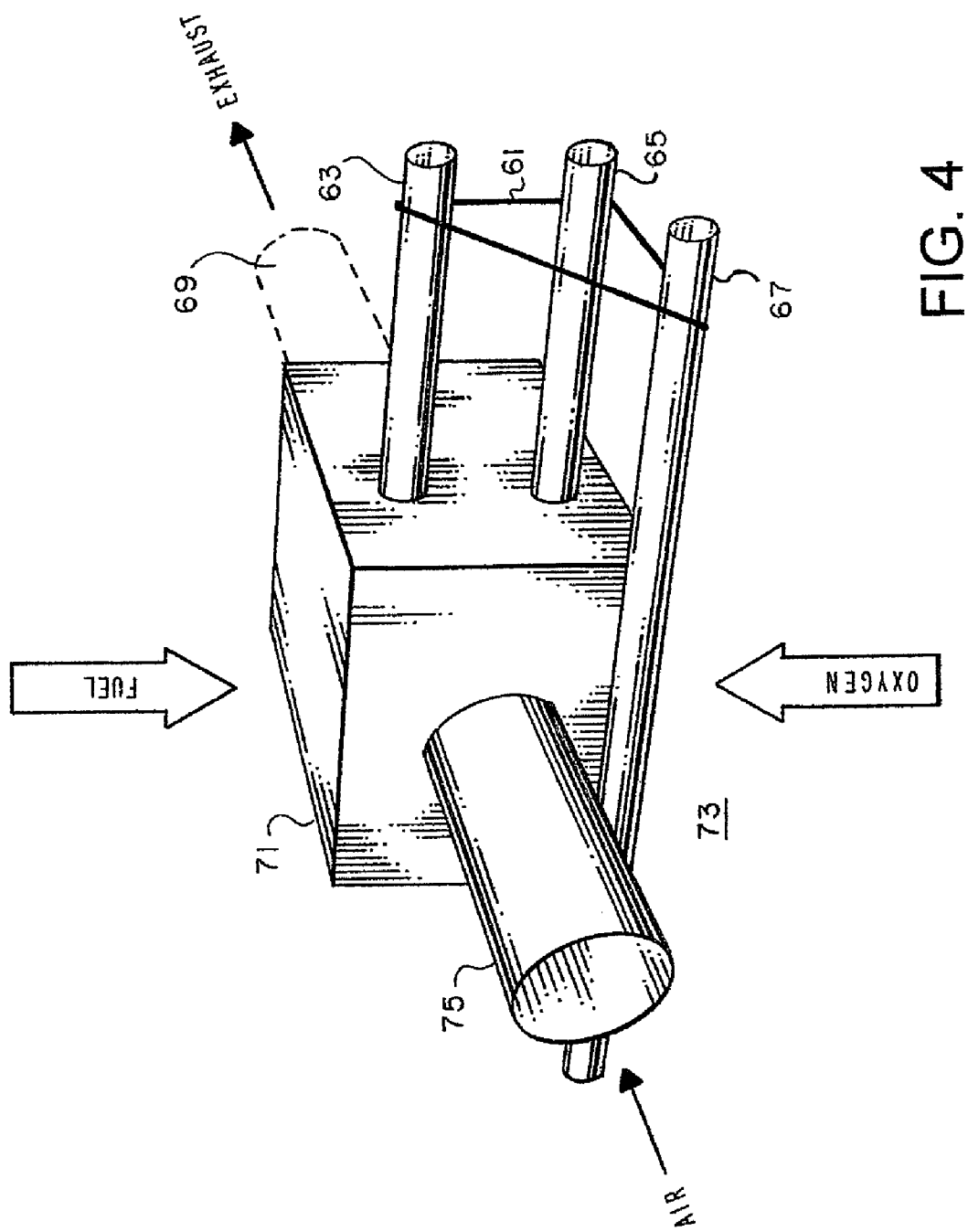
FIG. 4 is a drawing of a conceptual view of an embodiment of an air-breathing form of the pulsed detonation engine of the invention.

FIG. 3 depicts a cross sectional view of the pulsed detonation engine of FIG. 2 incorporating the Shchelkin spiral of this additional preferred embodiment. Tube 10 is shown with Shchelkin spiral 31 in place positioned near to igniter 5. Mixer 33 is shown receiving the air, oxidizer and fuel from the rotary supply valves. Spiral 31 disturbs the flow and thereby enhances the efficiency of the engine operation and speeds the transition to detonation mode at startup.

Figure 8:
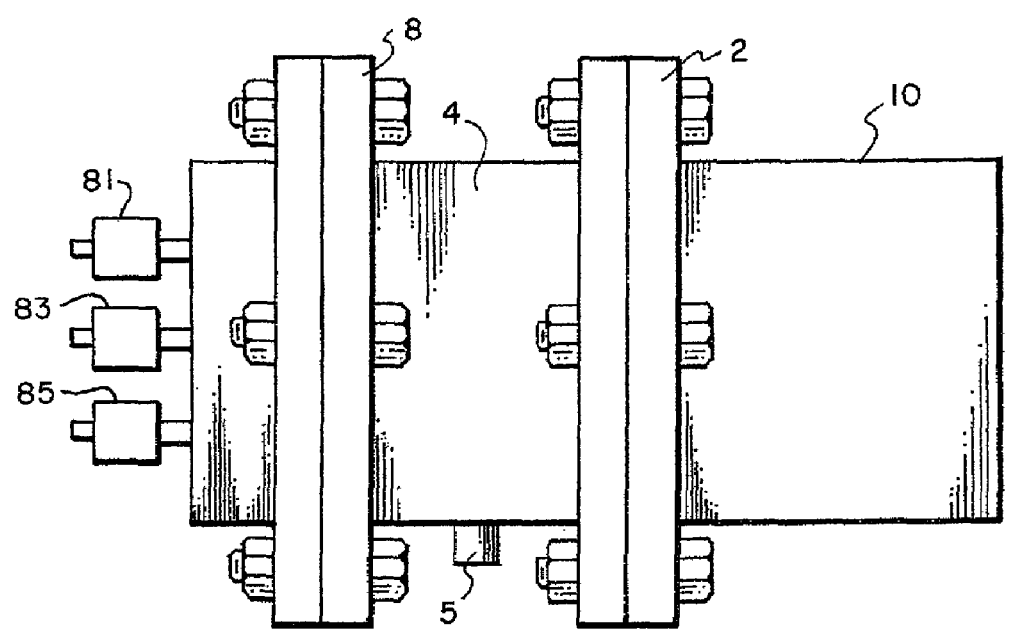
FIG. 8 is a drawing of an alternative embodiment of the pulsed detonation engine depicting solenoid valves.

In FIG. 2, a second preferred embodiment of a pulsed detonation engine of the invention is depicted. In FIG. 2, the tube 10 of FIG. 1 is again provided with flange 2 coupling the tube 10 to an ignition chamber 4 with igniter 5. Flange 8 couples the ignition chamber 4 to an end cap which receives three inputs, one for fuel, one for an oxidizer such as oxygen, and one for compressed air. Now the FIG. 2 shows in detail the supply valves. Valve 21 provides the fuel, valve 23 provides the compressed air, and valve 25 provides the oxidizer. FIG. 8 shows an alternative embodiment with solenoid valves. Valve 81 provides the fuel, valve 83 provides the compressed air, and valve 85 provides the oxidizer.

Figure 5A:
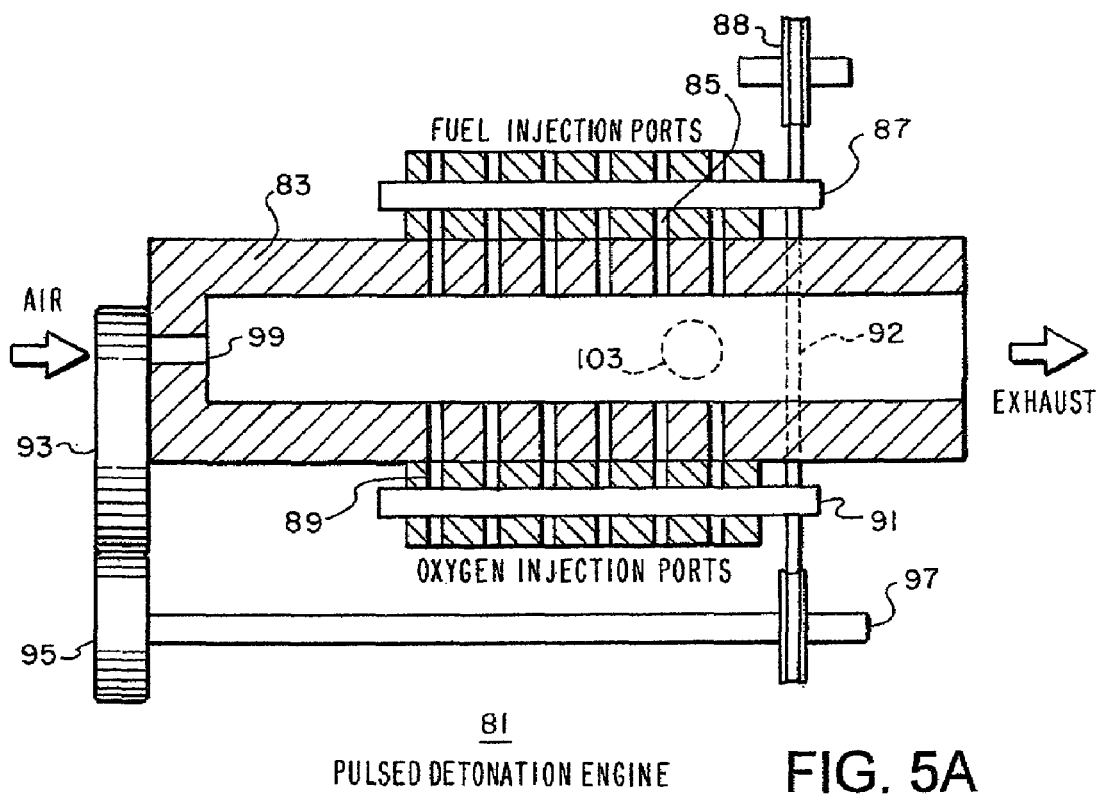
FIG. 5A is a first view of another preferred embodiment of the pulsed detonation engine of the invention.
Figure 5B:
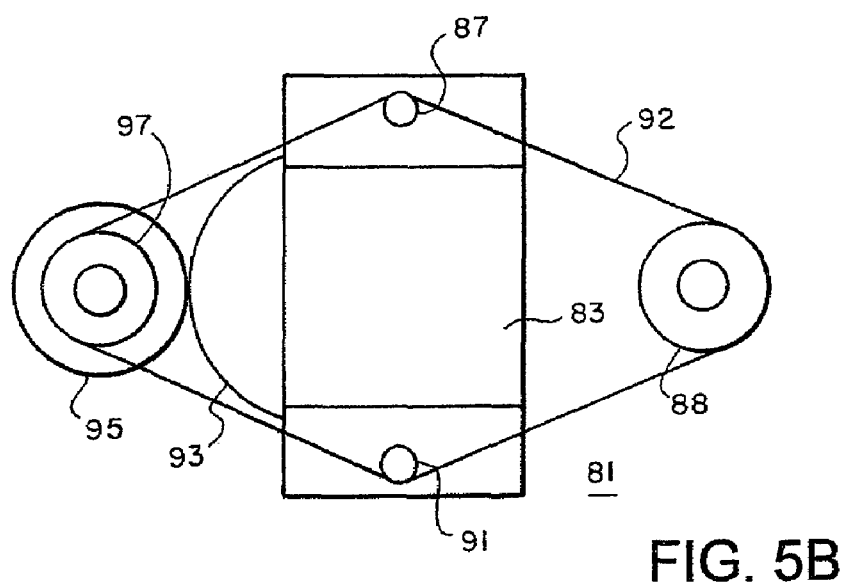
FIG. 5B is a second view of the preferred embodiment of FIG. 5A.

FIG. 5a depicts another preferred embodiment of a pulsed detonation engine of the invention 81. Shown in cross section, chamber 83 has multiple sidewall ports for fuel injection 85 controlled by a rotary valve 87 for supplying fuel into the ports, oxidizer injection ports 89 which are controlled by a rotary valve 91 for supplying an oxidizer, preferably oxygen, into the chamber, drive shaft 97 is coupled to a pulley 95 which operates the air input valve 93 which operates by rotating action over an intake port 99 to receive compressed air into the chamber. Ignitor 103 is placed into the chamber 83 to provide the energy required to initiate and sustain detonation.

In operation, a belt or chain 92, only partially shown in FIG. 5a, is used to synchronously operate the fuel valve 87, the oxidizing valve 91, and the air valve 93 by means of drive pulley 95. Ignitor 103 is used to cause the pulsed detonation cycles as described above and air valve 93 is also used to purge chamber 83 between detonation cycles.

As a further alternative to the mechanical rotary valves shown in FIG. 2, solenoid electrical valves may be used instead to provide the pulsed fuel, compressed air and oxidizer required to the ignition chamber, as shown in FIG. 8. A commercially available solenoid valve that partially fulfills the requirements stated above is one in the Numatech.RTM. TM series, which has a maximum operating frequency of 50 Hz, as quoted by the manufacturer. These valves are also commercially available from suppliers. The fuel can be any one of several known fuels, preferably a locally available and economical fuel, such as propane or methane (natural gas), may be used. Other known alternatives such as hydrogen or butane may be used as well as other hydrocarbon-based fuels. In one preferred embodiment, propane is used plus oxygen is used as an oxidizer, and these are combined with the incoming compressed air. The compressed air should be at about 2-3 atmospheres, or more, for efficient operation. Other oxidizers and fuels can be used as is known to those skilled in the art. The oxidizer enhances operational efficiency but is not necessarily required, and for simplicity in remote areas, the fuel may be chosen so as to eliminate the need for a separate oxidizer or the fuel may be enhanced prior to use in the engine by adding oxidizing compounds.

Figure 6:
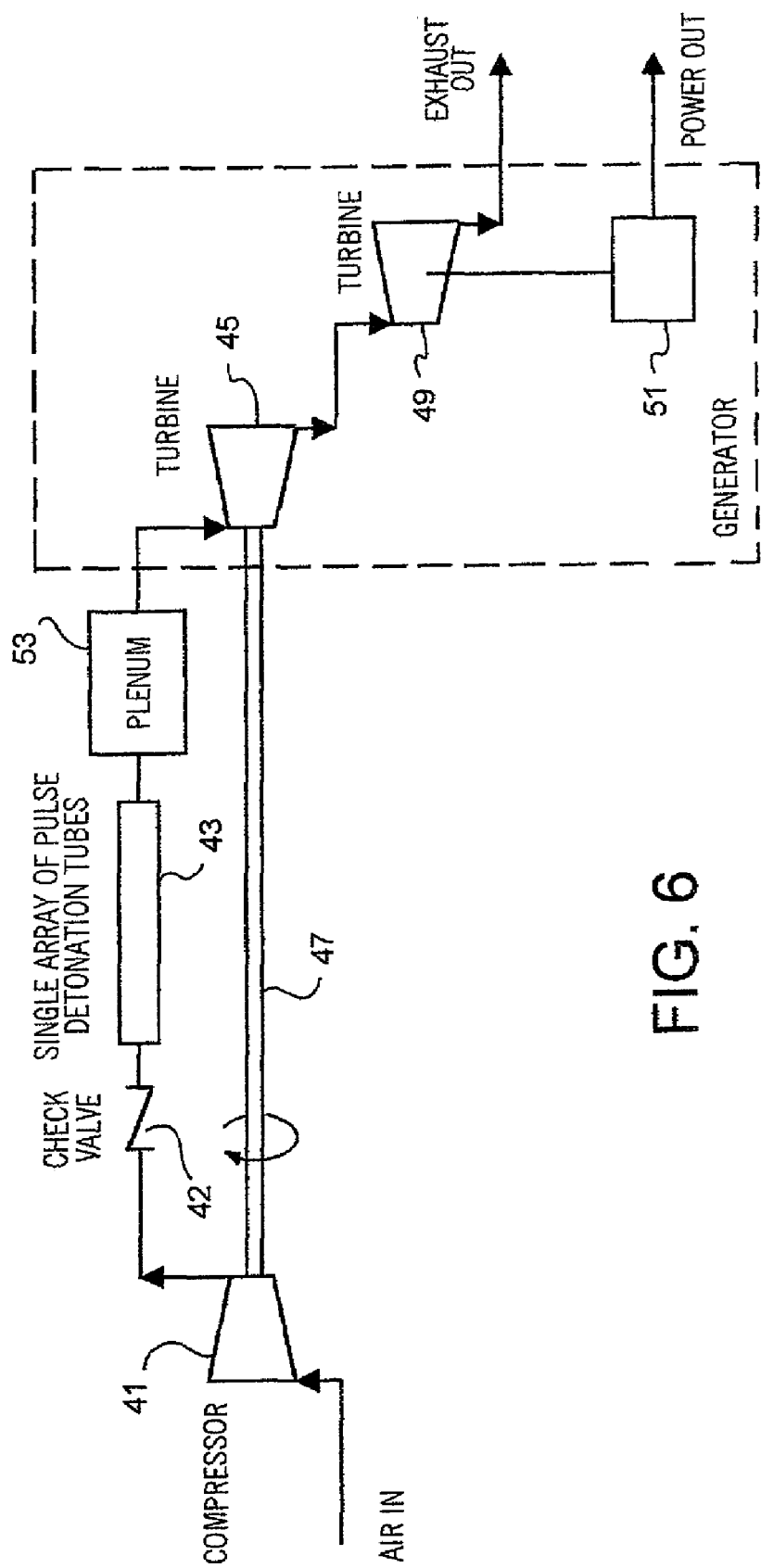
FIG. 6 is a drawing of a first preferred embodiment of the power generator of the invention.

FIG. 6 depicts a preferred embodiment of a power generator using the pulsed detonation engine of FIG. 2 or FIG. 3. In FIG. 6, a mechanical compressor 41 is shown receiving ambient air at an intake. (As an alternative, the air intake and mechanical compressor could be replaced with a source of compressed air as in FIG. 1.) The mechanical compressor 41 may be an existing off-the-shelf component, for example, for a small scaled detonation engine of the invention, it may be a compressor from a commercially available remote controlled model jet engine; or at a larger scale it could be a compressor such as is used in a cruise missile engine, as are known to be available from Williams International, among other suppliers. A detonation engine 43, as for example the one shown FIG. 2, then receives at least a part of the airflow (now, compressed air) output by compressor 41. Check valve 42 allows air to flow from compressor 41 into pulsed detonation engine 43 but checks any undesired flow from the detonation tube back to compressor 41. Part of the compressed air from the output of compressor 41 is sent to the detonation tube 43, the remaining flow is sent downstream to a turbine. The pulsed detonation engine 43 again requires rotary or electrical fuel valves which supply propane, methane or another fuel, oxygen, and mixes them and delivers the fuel and oxidizer mix into tube. Again as in FIG. 1 a high energy igniter is used to cyclically create detonations at an appropriate frequency, which could be as low as a few Hz or as high as 200 Hz, again using the high energy arc of the preferred embodiment, typically 18 Joules of energy is delivered. A pulsed detonation wave is created in engine 43 which is used to drive a first turbine 45, this turns shaft 47 which in turn drives the compressor at the intake 41. The exhaust is then directed to and drives a second turbine 49, which is used to mechanically power generator 51. The turbines and generator may be for example commercially available components, for example the turbines may be similar to those used in turbochargers for automotive applications.

In an enhanced preferred embodiment, the remaining exhaust flow may be used in a heat exchanger to capture additional thermal energy as heat before being released into the environment as exhaust. Additional enhanced features may include some burning of the exhaust using an afterburner to provide a cleaner exhaust product with little or no remaining fuel or other combustible elements in it.

Figure 7:
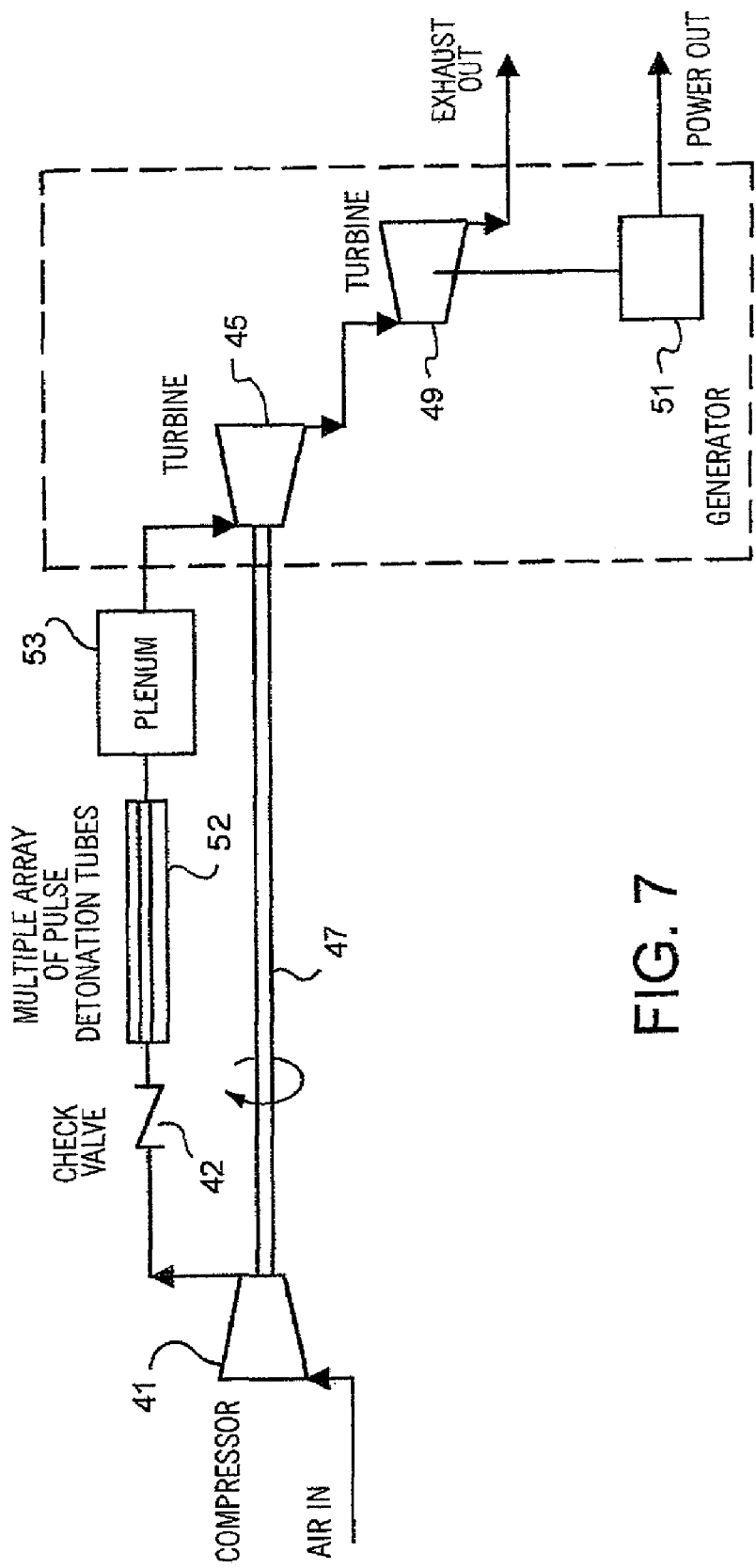
FIG. 7 is a drawing of another preferred embodiment of the power generator of the invention.

The embodiment of FIG. 7 may have additional features added to provide another preferred embodiment, as shown in FIG. 6. A multiple chamber pulsed detonation engine may be used, each chamber 52 being fired in a predetermined order at a different time in an overall cycle. Each chamber is a pulsed detonation engine as depicted in FIGS. 2 and 3. This enhancement of the earlier embodiment provides additional thrust to the turbines and thereby enables the generator to produce additional electric power. In this embodiment, multiple pulsed detonation engines drive the first turbine by firing in a phased fashion to provide proportionally increased thrust. Each one of the engines has an air intake, a rotary valve or solenoid fuel valve, and preferably a corresponding oxidizer or oxygen valve, for receiving the fuel and supplying it to the individual chamber as shown in FIG. 2. In FIG. 7 a plenum 53 is provided at the output of the now multiple detonation tubes. The plenum 53 is used, in part, to dampen the individual pulsed output at the detonation tube exhausts and further to provide a kinetic energy to enthalpy conversion which functions to slow the gases down and to simultaneously increase the pressure. The plenum 53 also functions to prevent pulsations from the several pulsed detonation engines from reaching the turbine 45 and prevents damage to the turbines downstream due to vibrations or mismatched detonation waves. Again, the turbine 49 is used to turn shaft 47 which drives the mechanical compressor 41. The exhaust gas flowing from the first turbine is directed to the second turbine 49 which drives the generator 51.

The generator of the invention may be used in a variety of applications. Smaller sized generators of the preferred embodiments might be used to generate 1 kW, or larger ones with multiple tubes may be used to generate 10 kW, or more. A properly scaled mechanical compressor may be used, or previously compressed air could be used to supply the air needed for the process. Oxygen or other known oxidizers are supplied in a preferred embodiment but may not be used for simplicity in other embodiments. The intake valves could be replaced with intakes along the sidewalls of the detonation tubes. Additional power generation could be achieved by ionization of the exhaust stream by adding ionized particulates or other means, and using a magnetohydrodynamic (MHD) generator to capture the resulting energy from the ionic flow.

Those skilled in the art will recognize that other modifications and substitutions may be provided with respect to the invention disclosed herein without departing from the scope and spirit of the appended claims.

What is claimed is:

1. A power generating apparatus comprising:
    a source of compressed air having an air intake and outputting compressed air;
    a pulsed detonation tube section receiving the compressed air, and having an exhaust output;
    a fuel input valve to provide cyclical fuel bursts into the pulsed detonation tube section;
    an air intake valve to provide the compressed air cyclically into the pulse detonation tube section, a common driving means to operate the fuel input valve and the air intake valve, the common driving means being a belt or a chain;

an igniter for providing into said pulsed detonation tube section a high energy cyclical ignition pulse which is synchronized to said fuel valve bursts, the fuel being combusted in response to the ignition pulse and producing a high velocity pressure wave;

a turbine coupled to the exhaust of said pulsed detonation tube section which is turned by the energy of said pressure wave and having an output; and a generator coupled to the output of said turbine and generating electrical power as a result of the force provided by said turbine due to the pressure wave.

2. The generator set forth in claim 1, wherein the velocity of said pressure wave approximately equals the Chapman-Jouguet velocity, and a pulsed detonation wave is created.

3. The generator as set forth in claim 1, wherein the igniter and the fuel valve are operated to produce cyclical ignitions which have a frequency greater than 60 Hz.

4. The generator of claim 1, wherein the frequency of the ignition and fuel valve cycles is greater than 20 Hz.

5. The generator of claim 1, wherein said source of compressed air further comprises:
    a mechanical compressor having an output coupled to the air intake, the compressor being coupled to a shaft for causing the compressor to rotate and thereby creating compressed air at its output; and
    a second turbine having its input at the output of the pulsed detonation tube, and having an output coupled to the input of the first turbine, and being coupled to rotate said shaft and drive said compressor in response to the force of said pressure wave.

6. The generator of claim 5 wherein said compressor outputs a pressure of at least about 1.3 atmospheres.

7. The generator of claim 1 and further comprising a valve receiving an oxidizer which is supplied to said pulsed detonation tube in cyclical bursts that are synchronized to said fuel intake bursts.

8. The generator of claim 7 wherein said oxidizer is oxygen.

9. The generator of claim 1 wherein said fuel is one selected from the group of compounds consisting of butane and its compounds, methane and its compounds and propane and its compounds.

10. The generator of claim 1 wherein said fuel is hydrogen.

11. The generator of claim 1, wherein said pulsed detonation tube further comprises:
    a plurality of parallel detonation tubes, each having a fuel intake valve for receiving fuel, and each having a high energy ignitor, and each having an output; and
    a plenum at the output of said parallel detonation tubes, for receiving the pressure waves from each of said parallel detonation tubes, and having an output directed to the first turbine.

12. The generator of claim 1 and further comprising a coil forming a Shchelkin spiral positioned within said detonation tube adjacent said igniter for enhancing the deflagration to detonation transition within said detonation tube.

13. The generator of claim 1 wherein said igniter further comprises a triggered spark gap device within said detonation tube.

14. A pulsed detonation power generator comprising:
    a pulsed detonation chamber having an intake end and an exhaust end and having sidewalls along its length;
    an air intake port coupled to the intake of said pulsed detonation chamber;
    an air intake valve for receiving compressed air and for selectively supplying it into said air intake port;
    a plurality of fuel injection ports located adjacent one another in a first sidewall of said pulsed detonation chamber;
    a fuel supply valve for receiving fuel and selectively supplying to said plurality of fuel injection ports;
    a plurality of oxidizer injection ports located adjacent one another in a second sidewall of said pulsed detonation chamber;
    an oxidizer supply valve for receiving said oxidizer and selectively supplying it to said plurality of oxidizer ports;
    an ignitor for causing cyclical detonation of a mixture of fuel, air and oxidizer within said pulsed detonation chamber;
    a compressor for supplying compressed air to said air intake valve; and
    a turbine coupled to said exhaust end for receiving the energy from said pulsed detonation chamber and driving a generator to produce electrical power.

15. The pulsed detonation generator of claim 14, and further comprising a drive belt for operating the air intake valve, the fuel supply valve, and the oxidizer supply valve and being driven by a drive pulley.

16. The pulsed detonation generator of claim 15 and further comprising:
    a second turbine coupled between the exhaust end of said pulsed detonation chamber and said turbine, said second turbine for operating a driveshaft which is used to power said compressor and said drive pulley, the remaining energy from said exhaust end being directed to said turbine for generating electrical power.

17. An electrical power generating apparatus, comprising:
    a first turbine outputting electrical power in response to a hot exhaust flow input;
    a compressor rotating about an axis, for outputting compressed air in response to a rotating driveshaft;
    a second turbine for rotating the driveshaft in response to a hot exhaust flow at its input and outputting the remaining hot exhaust;
    a plenum for receiving a plurality of hot exhaust streams and mixing them together, for outputting hot exhaust to said second turbine;
    a plurality of pulsed detonation engines arranged adjacent one another to receive the compressed air from said compressor and having hot exhaust outputs coupled to the input of said plenum, each pulsed detonation engine further comprising:
    a pulsed detonation chamber having an intake end and an exhaust end and having sidewalls along its length;
    an air intake port coupled to the intake of said pulsed detonation chamber;
    an air intake valve for receiving compressed air and for selectively supplying it into said air intake port;
    a plurality of fuel injection ports located adjacent one another in a first sidewall of said pulsed detonation chamber;
    a fuel supply valve for receiving fuel and selectively supplying to said plurality of fuel injection ports;
    a plurality of oxidizer injection ports located adjacent one another in a second sidewall of said pulsed detonation chamber;

an oxidizer supply valve for receiving said oxidizer and selectively supplying it to said plurality of oxidizer ports;

an igniter for causing cyclical detonation of a mixture of fuel, air and oxidizer within said pulsed detonation chamber;

a control circuitry for causing detonations in said plurality of pulsed detonation engines to occur in a phased fashion, to produce a continuous exhaust flow into said plenum, which produces a continuous hot exhaust output to drive said first and second turbines.

18. The apparatus of claim 17, wherein said plurality of pulsed detonation engines are arranged in a circular fashion around said driveshaft.

19. The apparatus of claim 17, wherein said plurality of pulsed detonation engines each further comprise a water jacket for circulating water around said pulsed detonation engines and thereby cooling said pulsed detonation engines.

20. The apparatus of claim 17, wherein each of said pulsed detonation engines further comprises a valve drive system for operating the air intake, fuel supply and oxidizer supply valves.

21. A method for generating electrical power, comprising the steps of:
providing a supply of compressed air;
providing a pulsed detonation chamber coupled for receiving the compressed air at an air intake;
providing a fuel supply valve for receiving fuel and supplying it into said pulsed detonation chamber in a controlled manner;
providing an oxygen supply valve for receiving oxygen and supplying into said pulsed detonation chamber in a controlled manner;
a common drive means for operating at least the fuel supply valve and the oxidizer supply valve, and being driven by a drive pulley;
providing an ignitor for causing detonation of said fuel, air, and oxygen mixture in said pulsed detonation chamber in a cyclical manner at a first frequency;
providing a turbine and generator coupled to the exhaust from said pulsed detonation engine and producing electrical power in response to the exhaust from said pulsed detonation engine; and
operating said pulsed detonation engine to create an exhaust flow into said turbine to produce electrical power.

22. The method of claim 21 wherein said first frequency is greater than 20 Hz.

23. The method of claim 22 wherein said first frequency is greater than 60 Hz.

24. A pulsed detonation engine, comprising:
a source of compressed air having an air intake and outputting compressed air;
a pulsed detonation tube section receiving the compressed air, and having an exhaust output;
a fuel input valve to provide cyclical fuel bursts into the pulsed detonation tube section;
an igniter for providing into said pulsed detonation tube section a high energy cyclical ignition pulse in excess of 10 Joules of energy which is synchronized to said fuel valve bursts, the fuel being combusted in response to the ignition pulse and producing a high velocity pressure wave;
a coil forming a Shchelkin spiral positioned within said pulsed detonation tube adjacent said igniter for enhancing the deflagration to detonation transition within said pulsed detonation tube;

whereby in response to fuel being input into the pulsed detonation tube and repeatedly ignited by cyclic pulses from said igniter, a pulsed detonation is achieved which produces a pressure wave within said pulsed detonation tube having a velocity that is at least the Chapman-Jouquet velocity.

25. The pulsed detonation engine of claim 24, wherein the source of compressed air comprises:
a mechanical compressor having an output coupled to the air intake, the compressor being coupled to a shaft for causing the compressor to rotate and thereby creating compressed air at its output; and
a turbine having its input at the output of the pulsed detonation tube, and having an output exhaust, and being coupled to rotate said shaft and drive said compressor in response to the force of said pressure wave.

26. The pulsed detonation engine as set forth in claim 24, wherein the igniter and the fuel valve are operated to produce cyclical ignitions which have a frequency greater than 60 Hz.

27. The pulsed detonation engine of claim 24, wherein the frequency of the ignition and fuel valve cycles is greater than 20 Hz.

28. The generator of claim 24 wherein said compressor outputs a pressure of at least about 1.3 atmospheres.

29. The pulsed detonation engine of claim 24 and further comprising a valve receiving an oxidizer which is supplied to said pulsed detonation tube in cyclical bursts that are synchronized to said fuel intake bursts.

30. The pulsed detonation engine of generator of claim 29 wherein said oxidizer is oxygen.

31. The pulsed detonation engine of claim 30 wherein said fuel is one selected from the group of compounds consisting of butane and its compounds, methane and its compounds and propane and its compounds.

32. The pulsed detonation engine of claim 24 wherein said fuel is hydrogen.

33. The pulsed detonation engine of claim 24 wherein said pulsed detonation engine further comprises:
an oxidizer supply valve for receiving said oxidizer and selectively supplying it to said pulsed detonation tube section; and
an air intake valve for receiving said compressed air and selectively supplying it to said pulsed detonation tube section.

34. The pulsed detonation engine of claim 33 wherein said fuel intake valve; said oxidizer supply valve; and said air intake valve are mechanical rotary valves.

35. The pulsed detonation engine of claim 33 wherein said mechanical rotary valves are coupled to a common driving means.

36. The pulsed detonation engine of claim 35 wherein said common driving means is a belt.

37. The pulsed detonation engine of claim 35 wherein said common driving means is a chain.

38. The pulsed detonatoin engine of claim 37 wherein at least one of said fuel intake valves; oxidizer valve and said air intake valve is a solenoid valve.

39. The pulsed detonation engine of claim 33 wherein said oxidizer supplied by said oxidizer supply valve is oxygen.

40. The pulsed detonation engine of claim 33 wherein each of said fuel, air intake and oxidizer supply valves are solenoid valves coupled to a control means for operating said valves.

41. A pulsed detonation engine, comprising:
a pulsed detonation chamber having an intake end and an exhaust end and having sidewalls along its length;

an air intake port coupled to the intake of said pulsed detonation chamber;

an air intake valve for receiving compressed air and for selectively supplying it into said air intake port;

a plurality of fuel injection ports located adjacent one another in a first sidewall of said pulsed detonation chamber;

a fuel supply valve for receiving fuel and selectively supplying to said plurality of fuel injection ports;

a plurality of oxidizer injection ports located adjacent one another in a second sidewall of said pulsed detonation chamber;

an oxidizer supply valve for receiving said oxidizer and selectively supplying it to said plurality of oxidizer ports;

an ignitor for causing cyclical detonation of a mixture of fuel, air and oxidizer within said pulsed detonation chamber;

a compressor for supplying compressed air to said air intake valve; and a turbine coupled to said exhaust end for receiving the energy from said pulsed detonation chamber and driving a rotary shaft coupled to and powering said compressor.

42. The pulsed detonation engine of claim 41, and further comprising a drive belt for operating the air intake valve, the fuel supply valve, and the oxidizer supply valve and being driven by a drive pulley.

43. An apparatus for pulsed detonation, comprising:

a compressor rotating about an axis, for outputting compressed air in response to a rotating driveshaft;

a turbine for rotating the driveshaft in response to a hot exhaust flow at its input and outputting the remaining hot exhaust;

a plenum for receiving a plurality of hot exhaust streams and mixing them together, for outputting hot exhaust to said second turbine;

a plurality of pulsed detonation engines arranged adjacent one another to receive the compressed air from said compressor and having hot exhaust outputs coupled to the input of said plenum, each pulsed detonation engine further comprising:

a pulsed detonation chamber having an intake end and an exhaust end and having sidewalls along its length;

an air intake port coupled to the intake of said pulsed detonation chamber;

an air intake valve for receiving compressed air and for selectively supplying it into said air intake port;

a plurality of fuel injection ports located adjacent one another in a first sidewall of said pulsed detonation chamber;

a fuel supply valve for receiving fuel and selectively supplying to said plurality of fuel injection ports;

a plurality of oxidizer injection ports located adjacent one another in a second sidewall of said pulsed detonation chamber;

an oxidizer supply valve for receiving said oxidizer and selectively supplying it to said plurality of oxidizer ports;

an igniter for causing cyclical detonation of a mixture of fuel, air and oxidizer within said pulsed detonation chamber;

a control circuitry for causing detonations in said plurality of pulsed detonation engines to occur in a phased fashion, to produce a continuous exhaust flow into said plenum, which produces a continuous hot exhaust output to drive said turbine.

* * * * *